United States Patent [19]

Arico

[11] Patent Number: 4,926,609
[45] Date of Patent: May 22, 1990

[54] EXHIBIT DISPLAY

[76] Inventor: Joseph Arico, 308 Larson Rd., North Brunswick, N.J. 08902

[21] Appl. No.: 259,197

[22] Filed: Oct. 18, 1988

[51] Int. Cl.$^5$ ............................................. A47F 5/00
[52] U.S. Cl. ......................................... 52/582; 52/71; 52/DIG. 13; 160/135
[58] Field of Search ....................... 160/135, 351, 352; 248/205.2, 239; 52/DIG. 13, 71, 541, 592, 238, 239, 582

[56] References Cited

U.S. PATENT DOCUMENTS

| | | | |
|---|---|---|---|
| 2,076,989 | 4/1937 | Harpham | 52/541 |
| 2,274,047 | 2/1942 | Derman | 160/135 |
| 2,591,786 | 4/1952 | Cronheim | 160/135 |
| 3,566,556 | 3/1971 | Nichols | 52/71 |
| 3,889,736 | 6/1975 | Firks | 160/351 X |
| 4,127,196 | 11/1978 | Boucher | 160/351 X |
| 4,375,829 | 3/1983 | Dorr et al. | |
| 4,444,240 | 4/1984 | Bannister | |
| 4,467,854 | 8/1984 | Godfrey | |
| 4,537,564 | 7/1985 | Hanna | 52/DIG. 13 X |
| 4,565,468 | 2/1986 | Crawford | 52/DIG. 13 |
| 4,573,513 | 3/1986 | Small et al. | |
| 4,601,145 | 7/1986 | Wilcox | |
| 4,635,418 | 1/1987 | Hobgood | |
| 4,644,993 | 2/1987 | Cooper | 160/351 X |
| 4,678,018 | 7/1987 | Goundstedt et al. | |
| 4,722,146 | 2/1988 | Kemeny | |
| 4,744,189 | 5/1988 | Wilson | 52/DIG. 13 X |
| 4,754,582 | 7/1988 | Cameron | 52/DIG. 13 |
| 4,785,565 | 11/1988 | Kuffner | 160/135 X |

FOREIGN PATENT DOCUMENTS 2368587 10/1976 France ........................ 52/DIG. 13

OTHER PUBLICATIONS

Snap Wall Advertisement, 12/10/87.
Publication Printed Sep. 1944, *Architecture Forum*.

*Primary Examiner*—Carl D. Friedman
*Assistant Examiner*—Jerrold D. Johnson
*Attorney, Agent, or Firm*—Lerner, David, Littenberg, Krumholz & Mentlik

[57] ABSTRACT

A freestanding knockdown exhibit display system having a plurality of structural panels hingedly connected in side-by-side relationship by flexible hinge members to form a pair of panel sections. A recessed portion on the front surface and along the bottom peripheral edge of each structural panel of one panel section is provided for releasably engaging the rear surfaces of corresponding structural panels in the other panel section so that the engaged panels are releasably secured together by VELCRO-like material provided therebetween. The front surfaces of each structural panel, and any decorative overlays connected thereto, are substantially flush from the upper panel section to the lower panel section. A VELCRO fastening material is utilized on the flexible hinge members and in association with the recessed portion so that no tools, hardware or supporting structure is required to erect or knock down the display system.

43 Claims, 6 Drawing Sheets

EXHIBIT DISPLAY

BACKGROUND OF THE INVENTION

The present invention relates generally to a knockdown display system, and more particularly, to a freestanding knockdown display system constructed of modular components which may be easily stored, transported and erected.

It is known for salesmen and other marketing personnel to promote goods or services at trade shows held in various locations. It is also known for individuals to make presentations to other individuals, clients or prospective clients at which ideas are conveyed or data is summarized. This frequently involves the display of information in the form of pictures, drawings, graphs, tables and the like. Since the manner in which such information is presented is extremely important to the marketing or acceptance of the product, service or idea, the display systems utilized in connection with such presentations should be professional and aesthetic in appearance. It has been recognized that it is highly uneconomical to utilize a new display system at each and every trade show or presentation, and therefore, it is desirable to have a transportable display system which individuals can carry with them. In this context, it becomes increasingly apparent that any such transportable display system must be lightweight, durable, inexpensive and simple in structure for easy on-site packaging and erection by one or very few individuals.

U.S. Pat. No. 3,571,999 to Downing discloses a knockdown display having some of the attributes and characteristics which are highly desirable for exhibit displays. Downing uses a plurality of sectionalized interfitting support posts and a set of supporting panels adapted to be connected across a pair of spaced apart support posts by VELCRO material or the like. Although erection of the knockdown display disclosed in Downing includes no hardware, the packaging and transportation of the Downing display system is awkward and burdensome for a single individual because of the bulky support posts utilized to removably connect the support panels. With this particular supporting structure, the panels will either overlap one another or be spaced apart from one another to debilitate the professional and aesthetic appearance of the display system, as well as the versatility of the system. Moreover, the use of the support posts results in a more complicated and time consuming set-up procedure, as well as limiting the manner in which the support panels can be connected, thereby limiting possible display configurations.

Other known display systems include those disclosed in U.S. Pat. Nos. 3,601,916 to Epstein; 3,913,656 to Guyer; 4,573,513 to Small et al; and Re. 30,777 to Ytter. Each of the display systems disclosed in these patents, however, suffer from the aforementioned infirmities or other shortcomings such as the requirement for hardware to erect the display, the limit on the various display configurations possible with the display system, or the transportability and durability of the display system.

SUMMARY OF THE INVENTION

The present invention specifically relates to a freestanding knockdown display system which is easily erected by a single individual and includes a plurality of structural panels of identical construction, flexible hinge means for releasably hinging a pair of the structural panels in side-by-side relationship to form a first panel section, and joining means on each structural panel for joining the first panel section to a second panel section of identical construction so that the first and second panel sections are freestanding in a vertical orientation. The structural panels include decorative overlays on one side thereof to define a display surface which is substantially contiguous and flush from panel section to panel section.

It is an object of the present invention to provide a freestanding knockdown display system which is easily erected and knocked down without the use of hardware and packagable and transportable from place to place by a single individual.

It is another object of the present invention to provide a freestanding knockdown display system made up of lightweight structural panels of the same construction adapted to be connected to one another to provide a variety of possible display configurations.

It is another object of the present invention to provide a freestanding knockdown display system having a professional and aesthetic appearance.

It is another object of the present invention to provide a freestanding knockdown display system which is adapted to receive auxiliary devices such as lights and shelves to hold magazines, pamphlets or samples of a given product or ware.

It is another object of the present invention to provide a freestanding knockdown display system having removable decorative overlays which are substantially flush and contiguous from panel section to panel section, and which can include on each individual panel a portion of a company or product insignia or other indicia so that the aggregate of the panels show the entire insignia or other indicia.

It is another object of the present invention to provide a freestanding knockdown display system having decorative overlays which can include a connecting surface on which auxiliary devices or posters can be connected.

The foregoing objects can be accomplished by providing a structural panel for a freestanding knockdown display system which comprises a panel having a front surface, a rear surface, top, bottom and side peripheral edges, and a recessed portion provided on the front surface adjacent one peripheral edge, wherein the recessed portion adapted for releasable engagement with the rear surface of one peripheral edge of another such panel, so that the front surfaces of the joined structural panels are substantially flush with one another.

BRIEF DESCRIPTION OF THE DRAWINGS

The above and other objects of the present invention will become apparent, as will a better understanding of the concepts underlying the present invention, by reference to the description which follows when taken in conjunction with the accompanying drawings in which.

DETAILED DESCRIPTION

Figure 1:
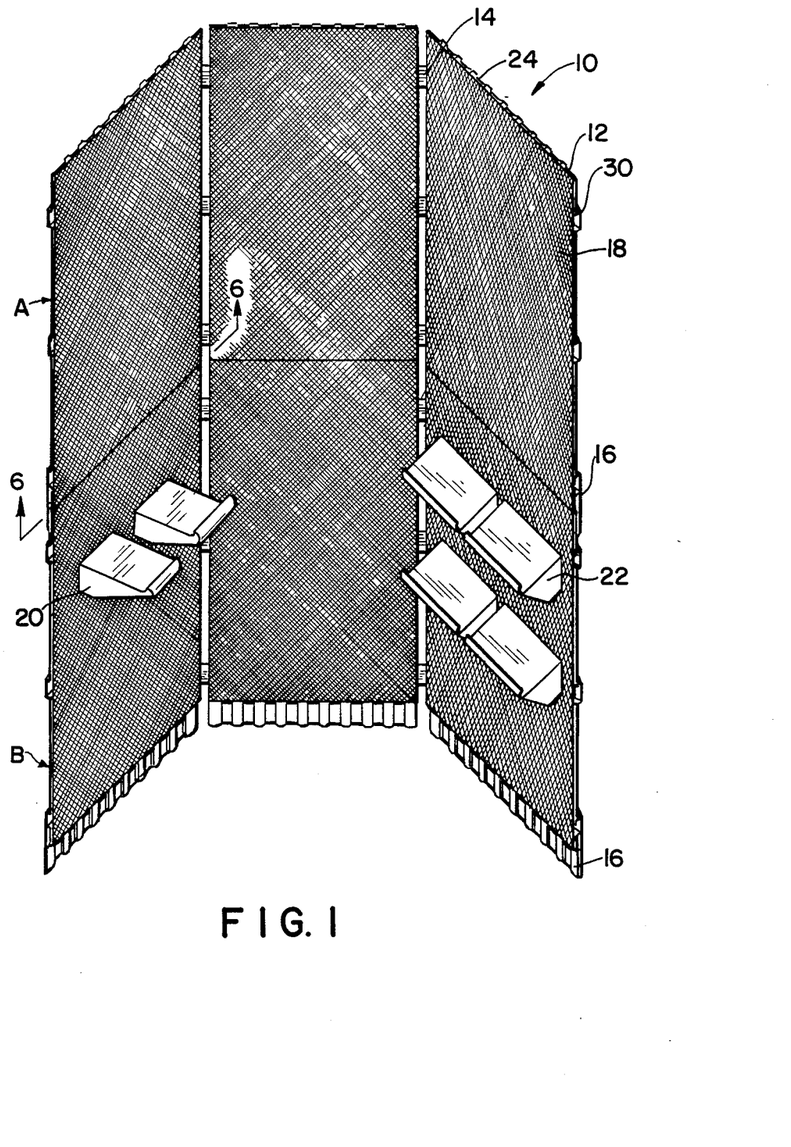
FIG. 1 is a perspective view of an exhibit display in accordance with the present invention.

Referring to the drawings, FIG. 1 illustrates one possible configuration of the freestanding knockdown display system generally designated as 10 constructed and assembled in accordance with one embodiment of the present invention. The display system 10 illustrated is made up of six individual and identically constructed structural panels 12 which are hingedly connected in side-by-side relationship by VELCRO material covered hinges 14. An upper panel section constructed of three structural panels 12 hinged together is releasably joined to a lower panel section of three similar structural panels. The upper panel section is designated generally by reference letter "A" while the lower panel section is designated generally by reference letter "B". The upper panel section A is releasably joined with the lower panel section B at a recess portion 16 provided at the bottom end of each structural panel 12, as will be described hereinafter. While the display system 10 shown in FIG. 1 can be inverted so that the recess 16 is situated at the top of each structural panel, the recess 16 of the illustrated configuration also serves as a kickplate. This not only protects the decorative surface of display system 10, but also provides an aesthetically pleasing appearance.

The display system 10 includes front or decorative overlays removably connected to the front surface of each structural panel 12. The decorative panels 18 can have any type of surface, but preferably include one of the materials used in a mechanical fastening device such as a VELCRO material wherein the fastening is effected by the pressure induced interlocking between the fibers, fingers or loops on two mating materials. With such a mechanical fastening material, various auxiliary items can be removably attached to the exhibit display system at any location thereon. Such auxiliary items include letters, posters or shelving such as the shelf 20 and inclined magazine rack 22 as shown in FIG. 1. Shelf 20 and magazine rack 22 include the corresponding VELCRO material about their connecting edges and are relatively strong when assembled on a decorative overlay, shelf 20 being capable of supporting approximately 3–5 lbs.

FIGS. 2–5 illustrate the particular structure of the structural panels 12, each of which is identically constructed of an ABS (acrylonitrile butadiene styrene) material, or any other suitably strong material. Each structural panel 12 is corrugated with a plurality of longitudinal ribs 24 to provide the structural integrity required of each structural panel 12 and, ultimately, a display system configured of such structural panels. The structural integrity of the structural panel 12 is attained by laterally spacing the plurality of longitudinal ribs 24, each of which extend from the top of the structural panel 12 to the bottom of the structural panel 12. It is particularly noted that the longitudinal ribs 24 extend through the recess 16 to the bottom of the structural panel 12 so that the ribs 24 can matingly receive the corresponding ribs 24 at the top end of another structural panel when the structural panels are joined in a vertical orientation. While ribs 24 can be of any suitable structure and shape, FIGS. 3B, 4A, 4B and 6 show ribs 24 to be generally U-shaped from a top view or cross-sectional view. The nesting of the longitudinal ribs 24 of the recess 16 with the longitudinal ribs 24 of the top portion of a second structural panel will be discussed in detail below.

Figure 2A:
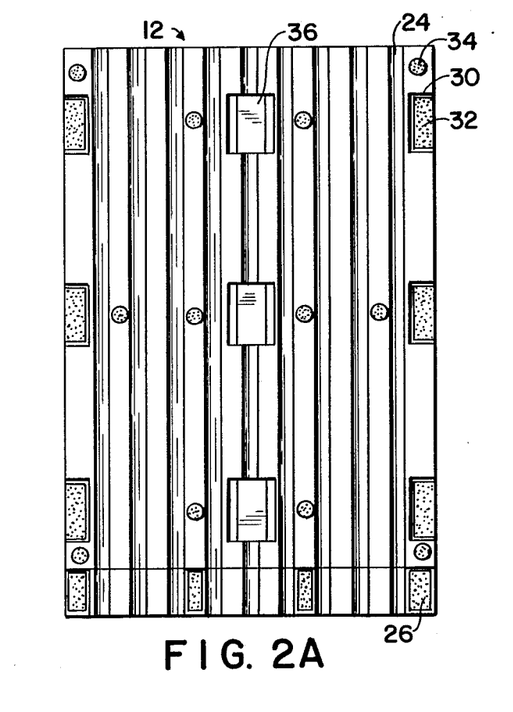
FIG. 2A is a front elevational view of a single structural panel in accordance with the present invention shown without a front overlay.
Figure 3A:
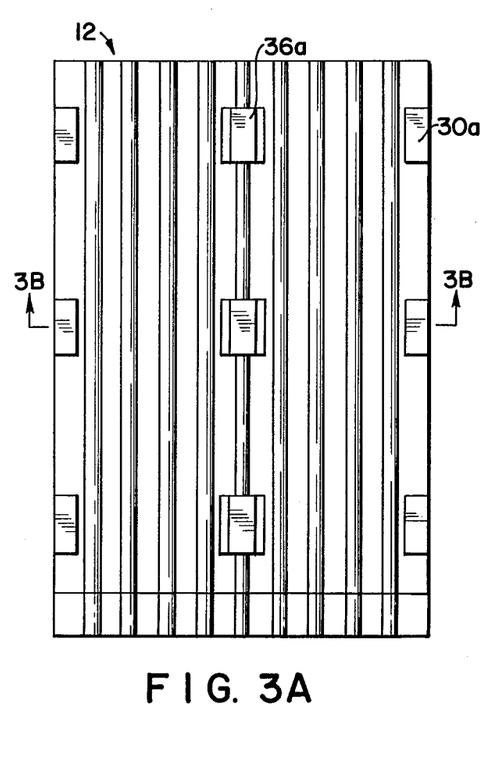
FIG. 3A is a rear elevational view of a single structural panel in accordance with the present invention shown without a rear overlay.
Figure 5A:
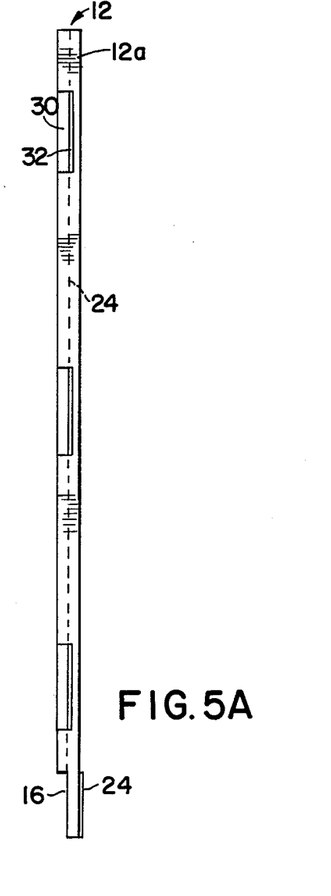
FIG. 5A is a side view of a single structural panel in accordance with the present invention shown without front and rear overlays.
Figure 5B:
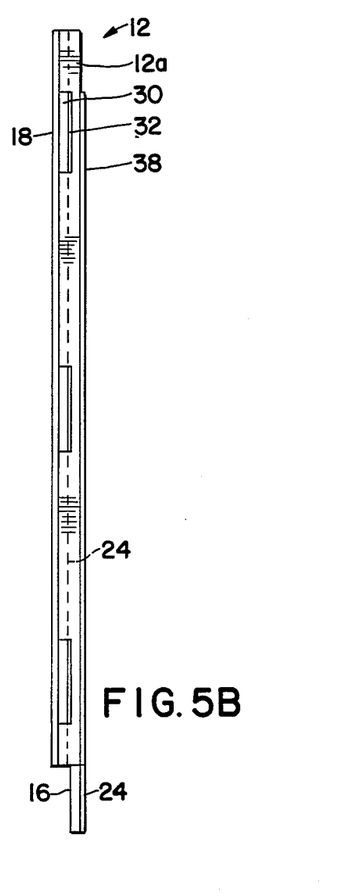
FIG. 5B is a side view of a single structural panel in accordance with the present invention shown with front and rear overlays.
Figure 6:
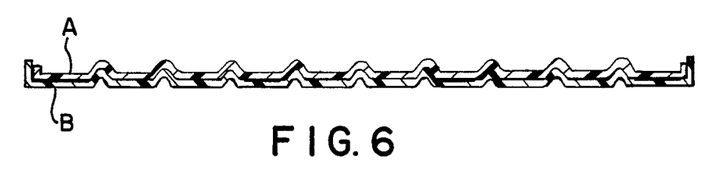
FIG. 6 is a cross-sectional view of the vertically joined panel structure taken on line 6—6 in FIG. 1, illustrating in particular the manner in which the recessed portion of a panel is joined with another panel.
Figure 7:
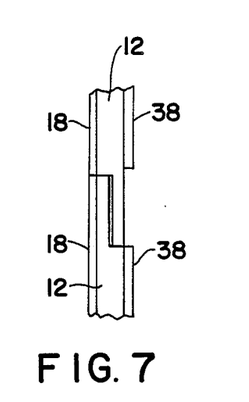
FIG. 7 is an exploded partial side view of the vertically joined panel structure shown in FIG. 1, illustrating in particular the manner in which the recessed portion of a panel is joined with another panel.

The recess 16 is located in the bottom portion of the structural panel 12 to define a secondary front surface and a second plane below a first plane which is defined by the front surface of each structural panel 12, as shown in FIGS. 5A and 5B. The depth of longitudinal ribs 24 from said secondary front surface to the bottom of the "U", and the distance from the first plane to the second plane are dependent upon one another so that upon vertically joining a first panel with a second panel at the recess 16, the front surfaces of the structural panels 12 are substantially flush and contiguous in accordance with the objects of the present invention. FIG. 6 shows the manner in which ribs 24 in the top portion of a structural panel 12 are nested within the ribs 24 of the recess 16 in the bottom portion of a second structural panel 12. Once nested as shown in FIG. 6, the front surfaces of the joined structural panels will be substantially flush, as shown in FIG. 7. The recess 16 includes recess joining means 26 on the surface thereof, as shown in FIG. 2A, for joining with registered panel joining means 28 provided on the rear surface of each structural panel 12, as shown in FIG. 3A. While the recessed joining means 26 and the registered panel joining means 28 can be comprised of any suitable structure or material that meet the criteria of the present invention, the preferred embodiment employs corresponding VELCRO fastening materials so that the panels are easily joined or removed from each other. Thus, the recessed joining means 26 comprises one of the VELCRO materials which is adapted to receive the registered panel joining means 28 which is comprised of the corresponding VELCRO material. The materials are removably fastened to one another by the pressure induced interlocking between the fibers, fingers or loops on the materials, as discussed above with respect to the decorative panels 18, so as to removably connect the panels to one another.

Once a pair of the structural panels 12 are joined as described above, the decorative overlays 18 on each structural panel will be substantially flush from the upper section A to the lower section B to provide an aesthetically pleasing and versatile display system. Of course, it is possible to provide a display system having one oversized decorative panel for removable connection to each pair of vertically stacked structural panels, thereby providing one continuous decorative surface from the upper panel section A to the lower panel section B.

Figure 8:
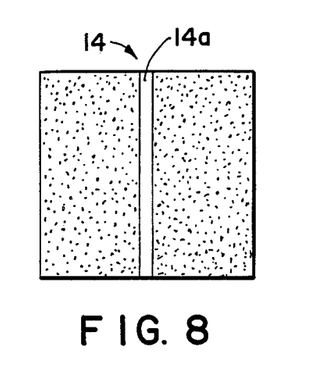
FIG. 8 is a top plan detail view of a VELCRO hinge in accordance with the present invention.

Each structural panel 12 also includes three hinge recesses 30 arranged longitudinally along either side thereof. A hinge fastener 32, made of a VELCRO material, is provided within each hinge recess 30 for operative engagement with a hinge 14, shown in FIG. 8, when connecting structural panels 12 in the lateral direction. The hinge 14 is preferably made from a polypropylene material or other suitably strong material and includes, on either side of the relief portion 14a, a VELCRO material which will mate with the VELCRO material that comprises the hinge fasteners 32. The relief portion 14a facilitates the flexibility of the hinge 14 and thus the pivoting of the structural panels 12 relative to one another when the panels are laterally assembled with the hinges 14.

Figure 2B:
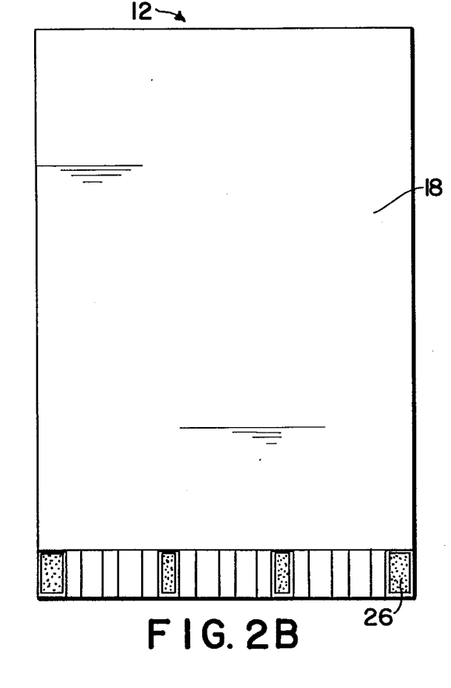
FIG. 2B is a front elevational view of a single structural panel in accordance with the present invention shown with a front overlay.

The front surface of the structural panel 12 includes randomly arranged overlay fasteners 34 for matedly engaging corresponding fasteners arranged in corresponding registration (not shown) on the back of the decorative overlay 18. Again, overlay fasteners 34 and the corresponding fasteners on the back of the decorative overlays 18 are preferably made of VELCRO materials. FIG. 2B shows a decorative overlay 18 in assembled position on the structural panel 12 wherein the decorative overlay 18 covers the hinge recesses 30 and the hinge 14.

Figure 3B:
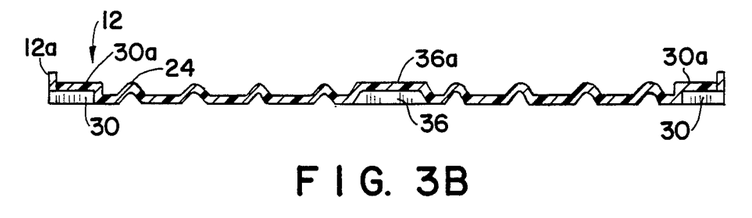
FIG. 3B is a cross-sectional view taken on line 3B—3B of FIG. 3A, illustrating in particular the secondary rear surface formed by the various recesses and depressions.
Figure 3C:
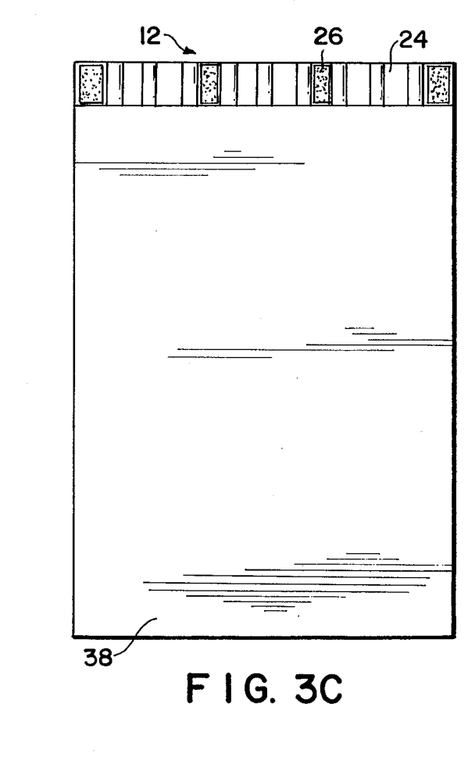
FIG. 3C is a rear elevational view of a single panel in accordance with the present invention shown with a rear overlay.
Figure 4A:
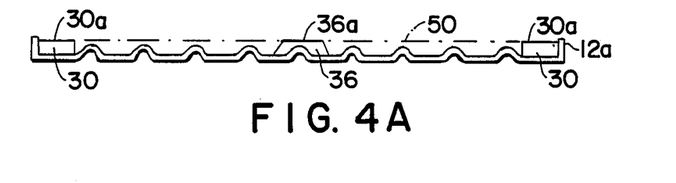
FIG. 4A is a top view of a single structural panel in accordance with the present invention without front or rear overlays.

Each structural panel 12 includes three medially located depressions 36 having a rear surface 36a, as shown in FIG. 3A and 3B. Collectively, the rear surfaces 36a of depressions 36 and the rear surfaces 30a of hinge recesses 30 form a secondary surface, as shown in FIG. 3B and 4A. The secondary plane 50 defined by this secondary surface is shown in dashed and dotted formation in FIG. 4A. The secondary plane 50 can be at the same height or slightly higher than the apex of the ribs 24 on the rear surface of the structural panel 12. A rear overlay 38, made of polypropylene, is connected to the rear surface 30a and 36a by any suitable means, but is preferably fixed by a glue or double back tape. The rear overlay 38 provides additional strength and structural integrity to each structural panel 12 by stiffening the same against flexure. It also provides a clean, professional appearing rear surface for any display system constructed with the structural panels.

Figure 4B:
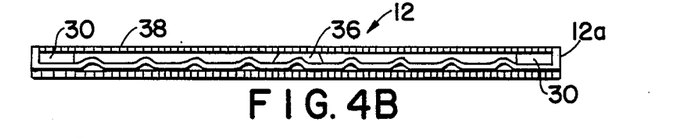
FIG. 4B is a top view of a single structural panel in accordance with the present invention shown with front and rear overlays.

It should be noted that the flanges 12a shown in FIGS. 3A, 4A and 4B are also provided to improve the structural integrity of the structural panel 12 and furnish a more aesthetic appearance from a side view such as that shown in FIGS. 5A and 5B. Thus, the flanges 12a extend rearwardly from the sides of each structural panel 12 in a direction substantially perpendicular to the longitudinal direction. This supplements the structural integrity added by virtue of the longitudinal ribs 24.

Figure 9:
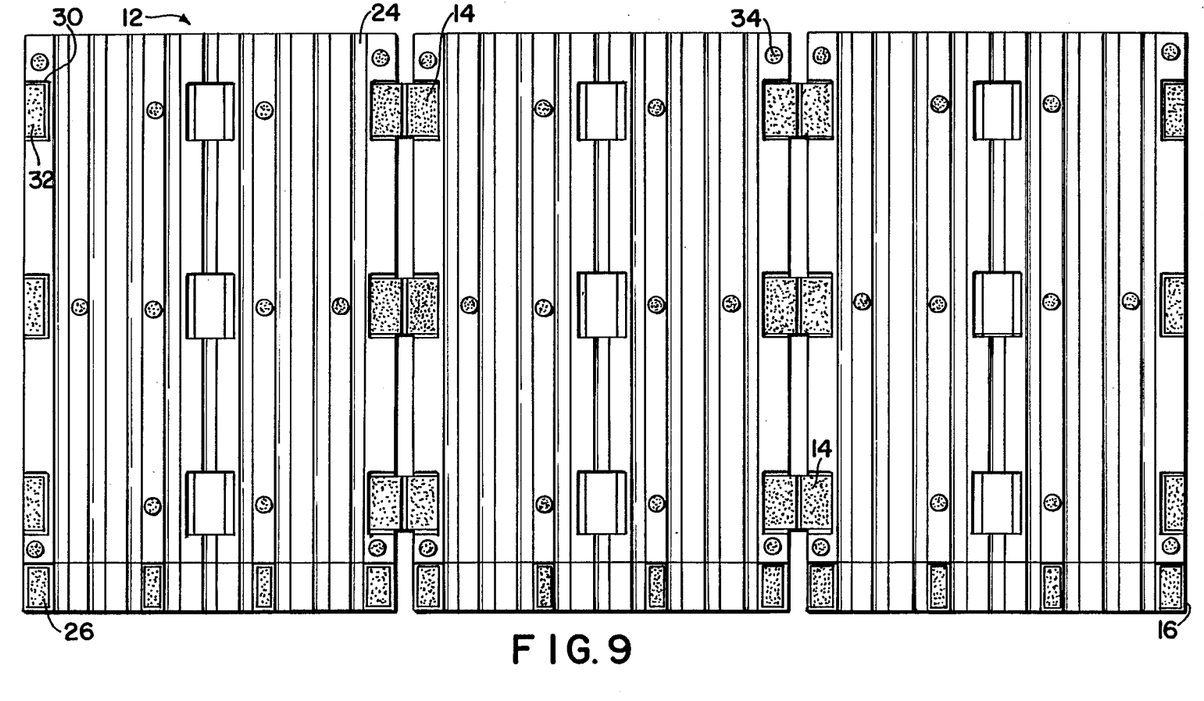
FIG. 9 is a top plan view of three structural panels without front overlays lying on a flat surface and being hingedly connected by flexible hinges, illustrating the manner in which the exhibit display is erected.

FIG. 9 shows three structural panels 12 lying on a flat surface so as to illustrate the ease with which a display system can be erected. Either panel section A or B of the display system 10 shown in FIG. 1 can be constructed simply by lying three (3) structural panels 12 in side-by-side arrangement as shown in FIG. 9, and placing the hinges 14 in the respective hinge recesses 30. A relatively small degree of force applied to the hinges 14 will effect the interlocking of the fibers, loops or fingers of the corresponding VELCRO fastening materials. Once both panel sections A and B are connected as shown in FIG. 9, they can be joined at the recess 16, as described above, and the decorative overlays 18 can be removably connected to the front surface of the structural panels 12. The system can then be stood up to be supported at the lower end of the lower panel section B. Of course, the hinges 14 are flexible so that the vertically stacked side panels of the display system 10 can moved relative to one another to provide the configuration shown in FIG. 1.

It is to be appreciated that the structural panels described herein are adapted to provide a variety of possible display configurations including desk-top configurations comprising only two (2) structural panels to a large exhibit display system comprising eight (b 8) or more structural panels. The decorative panels or the rear panels used in a given system may be VELCRO material covered, as described above, or any other surface such as one on which a slide presentation may be shown, one adapted for silk screening information or one adapted for writing while lecturing or making a presentation. Further, the structural panels can be of any suitable dimension, although it has been found that a size slightly less than 25"×40" is optimum for constructing the type of display systems contemplated by the present invention as the panels are easily handled by a single individual while erecting, knocking down or packaging the display systems and moreover while transporting the panels which comprise the display system.

While the foregoing description and figures illustrate one preferred embodiment of the exhibit display system in accordance with the present invention, it should be appreciated that certain modifications may be made in the structure and operation of the disclosed embodiment without departing from the spirit and scope of the present invention as defined by the claims which are set forth immediately below.

What is claimed is:

1. A structural panel for a freestanding knockdown display system comprising, a panel having a front surface, a rear surface, top, bottom and side peripheral edges, said panel being adapted to stand in a substantially vertical position on one of said peripheral edges, and a recessed portion, said recessed portion being on said front surface adjacent one peripheral edge, said recessed portion having securement means associated therewith to facilitate the releasable engagement of said recessed portion to the rear surface adjacent one peripheral edge of another such panel, by cooperating with complementary securement means on the rear surface of such panel, so that the front surfaces of the engaged structural panels are substantially flush with one another with substantially no obstruction from the front surface of one engaged panel to the front surface of the engaged panel.

2. The structural panel claimed in claim 1, wherein said recessed portion defines a secondary front surface, said secondary front surface being substantially parallel to said front surface and disposed at a predetermined rearward distance from said front surface to said rear surface.

3. The structural panel claimed in claim 2, including a plurality of recesses extending rearwardly from said front surface, said recesses having secondary rear surfaces, said secondary rear surfaces adapted for supporting a rear panel-stiffening overlay.

4. The structural panel claimed in claim 3, wherein said secondary rear surfaces include securing means for securing a rear panel-stiffening overlay to said panel.

5. The structural panel claimed in claim 2, wherein said panel has a top portion adjacent the top peripheral edge, said top portion including securement means on said rear surface, and said secondary front surface of said recessed portion includes registered securement means for releasable securement to the securement means of another such panel.

6. The structural panel claimed in claim 5, wherein said securement means and said registered securement means comprise two mated VELCRO materials.

7. The structural panel claimed in claim 1, wherein said recessed portion is located adjacent to the bottom peripheral edge for releasable engagement with the rear surface adjacent to the top peripheral edge of another panel.

8. The structural panel claimed in claim 1, including securing means for securing an overlay on said panel.

9. The structural panel claimed in claim 8, including at least one overlay panel releasably connected by said securing means to said front surface of said panel.

10. The structural panel claimed in claim 1, including at least one hinge recess adjacent at least one side peripheral edge of said panel, said hinge recess adapted for receiving a flexible hinge for releasably hinging said panel in a side-by-side relationship with another such panel.

11. The structural panel claimed in claim 10, wherein said panel includes a plurality of recesses extending rearwardly from said front surface, said recesses and said at least one hinged recess having secondary rear surfaces, said secondary rear surfaces being adapted to support a rear panel-stiffening overlay.

12. The structural panel claimed in claim 11, wherein said secondary rear surfaces include securing means for securing a rear panel-stiffening overlay to said panel.

13. The structural panel claimed in claim 1, wherein said recessed portion and said securement means are so constructed and arranged that upon securement of said panel with another such panel, the peripheral edge adjacent said recessed portion is juxtaposed with the engaged panel with no portion of the securement means therebetween.

14. The structural panel claimed in claim 1, wherein said securement means comprises a plurality of spaced connecting means adapted for connection to the rear surface of said another such panel.

15. A structural panel for a freestanding knockdown display system comprising, a panel having a front surface, a rear surface, top, bottom and side peripheral edges, said panel being adapted to stand in a substantially vertical position on one of said vertical edges, a recessed portion integral with said panel on said front surface adjacent one peripheral edge, said recessed portion being constructed and arranged for releasably engagement with the rear surface of one peripheral edge of another such panel, so that the front surfaces of the engaged structural panels are substantially flush with one another, and securement means associated with said recessed portion for releasably securing the engaged structural panels along their engaged peripheral edges, said securement means comprising a hook and loop fastening material on said recessed portion and a corresponding hook and loop fastening material on the rear surface adjacent one peripheral edge.

16. A structural panel for a freestanding knockdown display system comprising, a panel having a front surface, a rear surface, top, bottom and side peripheral edges, said panel being adapted to stand in a substantially vertical position on one of said peripheral edges, a recessed portion integral with said panel on said front surface adjacent one peripheral edge, said recessed portion being constructed and arranged for releasably engagement with the rear surface of one peripheral edge of another such panel, so that the front surfaces of the engaged structural panels are substantially flush with one another, said recessed portion defining a secondary front surface, said secondary front surface being substantially parallel to said front surface and disposed at a predetermined rearward distance from said front surface to said rear surface, and a plurality of laterally separated ribs extending longitudinally from the top peripheral edge to the bottom peripheral edge, said ribs protruding rearwardly from said front surface and said secondary front surface.

17. The structural panel claimed in claim 16, including a top portion adjacent to the top peripheral edge, said top portion including first engagement means on the rear surface, and said recessed portion including second engagement means, said second engagement means being adapted for matingly engaging the first engagement means of another panel.

18. The structural panel claimed in claim 17, wherein said first engagement means comprises a protuberant member protruding rearwardly from said front surface and said second engagement means provides protuberant receiving means for receiving said protuberant member.

19. The structural panel claimed in claim 16, wherein the ribs in said recessed portion include receiving means for matingly receiving the rearwardly protruding ribs adjacent one peripheral edge of another such panel.

20. The structural panel claimed in claim 16, wherein the ribs in said recessed portion have a hollow portion below said secondary front surface for matingly receiving the rearwardly protruding ribs adjacent one peripheral edge of another such panel.

21. A freestanding knockdown display system comprising, a plurality of structural panels of substantially similar construction, each said structural panel having a front surface, a rear surface, and top, bottom and side peripheral edges, flexible hinge means for releasably hinging at least a pair of said structural panels in a side-by-side relationship to form a first panel section, and joining means on a peripheral edge other than a side peripheral edge of each of said structural panels for vertically and removably joining said first panel section to a second panel section of substantially similar construction so that the front surfaces of the structural panels in said first panel section are substantially flush with the front surfaces of the structural panels in said second panel section with substantially no obstructions from said first panel section to said second panel section, wherein said joining means comprises a recessed portion, said recessed portion defining a secondary front surface, said secondary front surface being substantially parallel to said front surface and disposed at a predetermined rearward distance from said front surface to said rear surface, wherein each said structural panel includes a plurality of laterally-separated ribs extending longitudinally from the top peripheral edge to the bottom peripheral edge, said ribs protruding rearwardly from said front surface and said secondary front surface.

22. The freestanding knockdown display system claimed in claim 21, wherein the ribs in said recessed portion of each structural panel in said second panel section include receiving means for matingly receiving the rearwardly protruding ribs adjacent one peripheral edge of a corresponding structural panel in said first panel section.

23. The freestanding knockdown display system claimed in claim 21, wherein said ribs in said recessed portion of each said structural panel in said second panel section have a hollow portion below said secondary front surface for matingly receiving the rearwardly protruding ribs adjacent one peripheral edge of the corresponding structural panels in said first panel section.

24. The freestanding knockdown display system claimed in claim 21, wherein said recessed portion of each said structural panel of said first panel section is located adjacent to the bottom peripheral edge for releasable engagement with the rear surface adjacent to the top peripheral edge of a corresponding structural panel in said second panel section.

25. The freestanding knockdown display system claimed in claim 21, wherein each said structural panel includes a top portion adjacent to the top peripheral edge, said top portion including first engagement means on the rear surface, and said recessed portion of each said structural panel includes second engagement means, said second engagement means of a structural panel in said second panel section being adapted for matingly engaging the first engagement means of a structural panel in said first panel section.

26. The freestanding knockdown display system claimed in claim 25, wherein said first engagement means comprises a protuberant member protruding rearwardly from said front surface and said second engagement mean provides protuberant receiving means for receiving said protuberant member.

27. The freestanding knockdown display system claimed in claim 21, wherein each said structural panel in said first panel section has a top portion adjacent the top peripheral edge, said top portion including securement means on the rear surface thereof, and said secondary front surface of said recessed portion of each said structural panels in said second panel section includes registered securement means for releasable securement to the securement means of said structural panels of said first panel section.

28. The freestanding knockdown display system claimed in claim 27, wherein said securement means and said registered securement means comprised to mated VELCRO materials.

29. The freestanding knockdown display system claimed in claim 21, wherein each structural panel includes securing means for securing an overlay on each said structural panel.

30. The freestanding knockdown display system claimed in claim 29, including at least one overlay panel releasably connected by said securing means to the front surface of at least one structural panel.

31. The freestanding knockdown display system claimed in claim 21, wherein each said structural panel includes at least one hinge recess adjacent at least one side peripheral edge of said structural panel for receiving said flexible hinge means.

32. A freestanding knockdown display system comprising, a plurality of structural panels of substantially similar construction, each said structural panel having a front surface, a rear surface and top, bottom, and side peripheral edges, flexible hinge means for releasably hinging at least a pair of said structural panels in a side-by-side relationship to form a first panel section, and joining means on a peripheral edge other than a side peripheral edge of each of said structural panels for vertically and removably joining said first panel section to a second panel section of substantially similar construction so that the front surfaces of the structural panels in said first panel section are substantial flush with the front surfaces of the structural panels in said second panel section with substantially no obstructions from said first panel section to said second panel section, said joining means including securement means for releasably securing said first panel section to said second panel section, wherein said securement means comprises two mated hook and loop fastening materials.

33. A freestanding knockdown display system comprising, a plurality of structural panels of substantially similar construction, each said structural panel having a front surface, a rear surface and top, bottom and side peripheral edges, flexible hinge means for releasably hinging at least a pair of said structural panels in a side-by-side relationship to form a first panel section, and joining means on a peripheral edge other than a side-peripheral edge of each of said structural panels for vertically and removably enjoining said first panel section to a second panel section of substantially similar construction so that the front surfaces of the structural panels in said first panel section are substantially flush with the front surfaces of the structural panels in said second panel section with substantially no obstructions from said first panel section to said second panel section, each said structural panel including at least one hinge recess adjacent at least one side peripheral edge of said structural panel for receiving said flexible hinge means, wherein each of said structural panel includes a plurality of recesses extending rearwardly from said front surface, said recesses and said at least one hinged recess having secondary rear surfaces, said secondary rear surfaces being adapted to support a rear panel-stiffening overlay.

34. The freestanding knockdown display system claimed in claim 33, wherein said secondary rear surfaces include securing means for securing a rear panel-stiffening overlay to said panel.

35. The freestanding knockdown display system claimed in claim 33, including at least one rear panel-stiffening overlay secured to said secondary rear surfaces of at least one structural panel.

36. A freestanding knockdown display system comprising, a plurality of structural panels of substantially similar construction, each said structural panel having a front surface, a rear surface and a top, bottom, and side peripheral edges, flexible hinge means for releasably hinging at least a pair of said structural panels in a side-by-side relationship to form a first panel section, a second panel section of substantially similar construction as said first panel section, a recessed portion on said front surface adjacent a peripheral edge other than a side peripheral edge of each of said structural panels, said recessed portion defining a secondary front surface rearwardly spaced from said front surface, said secondary front surface of said recessed portion of each said structural panel of said first panel section having securement means associated therewith, said rear surface of each said structural panel of the second panel section having complementary securement means associated therewith, said securement means being cooperable with said complementary securement means to releasably engage said recessed portion of one structural panel to said rear surface of another structural panel to thereby vertically and releasably join said first panel section to the second panel section so that the front surfaces of the structural panels in said first panel section are substantially flush with the front surfaces of the structural panels in said second panel section with substantially no obstructions from said first panel section to said second panel section.

37. The freestanding knockdown display system claimed in claim 36, wherein each said structural panel in said first panel section includes a top portion, and wherein said recessed portion of each said structural panel in second panel section is disposed adjacent to the bottom peripheral edge of each said structural panel so that the bottom peripheral edge of each structural panel in said second panel section engages the rear surface of the top portion of each corresponding structural panel in said first panel section.

38. The freestanding knockdown display system claimed in claim 36, including at least one decorative overlay connected to the front surfaces of the structural panels.

39. The freestanding knockdown display system claimed in claim 38, wherein said at least one decorative overlay covers at least a pair of vertically joined structural panels, thereby providing a continuous decorative surface from said first panel section to said second panel section.

40. The freestanding knockdown display system claimed in claim 36, wherein said recessed portion and said securement means are so constructed and arranged that upon securement of each said structural panel in said first panel section with the structural panels of said section panels second panel section, the peripheral edge adjacent the recessed portion of each structural panel is juxtaposed with the respective structural panel in said second panel section with no portion of the securement means therebetween.

41. The freestanding knockdown display system claimed in claim 36, wherein said securement means comprises a first set of spaced connecting means, and said rear surface includes a second set of spaced connecting means registerable and mateable with said first set of spaced connecting means.

42. A freestanding knockdown display system comprising, a plurality of structural panels of substantially similar construction, each said structural panel having a front surface, a rear surface, and top, bottom and side peripheral edges, flexible hinge means for releasably hinging at least a pair of said structural panels in a side-by-side relationship to form a first panel section, a recessed portion provided on said front surface adjacent a peripheral edge other than a side peripheral edge of each of said structural panels, said recessed portion defining a secondary front surface rearwardly spaced from said front surface, said secondary front surface of said recessed portion of each said structural panel adapted for engaging said rear surface of each said structural panel to thereby vertically and releasably join said first panel section to a second panel section of substantially similar construction so that the front surfaces of the structural panels in said first panel section are substantially flush with the front surfaces of the structural panels in said second panel section with substantially no obstructions from said first panel section to said second panel section, securement means on said secondary front surface for releasably securing said first and second panel sections along their joined peripheral edges, wherein said securement means on said secondary front surface comprises a hook and loop fastening material, and said rear surface includes a hook and loop fastening material which matedly corresponds to said hook and loop fastening material on said secondary front surface.

43. A freestanding knockdown display system comprising, a plurality of structural panels of substantially similar construction, each said structural panel having a front surface, a rear surface and top, bottom and side peripheral edges, flexible hinge means for releasably hinging at least a pair of said structural panels in a side-by-side relationship to form a first panel section, a recessed portion provided on said front surface adjacent a peripheral edge other than a side peripheral edge of each of said structural panels, said recessed portion defining a secondary front surface rearwardly spaced from said front surface, said secondary front surface of said recessed portion of each said structural panel adapted for engaging said rear surface of each said structural panel to thereby vertically and releasably join said first panel section to a second panel section of substantially similar construction so that the front surfaces of the structural panels in said first panel section are substantially flush with the front surfaces of the structural panels in said second panel section with substantially no obstructions from said first panel section to said second panel section, wherein each structural panel includes a plurality of ribs extending longitudinally from the top peripheral edge to the bottom peripheral edge.

* * * * *